G. G. HASBROUCK.
PIANO.
APPLICATION FILED FEB. 14, 1908.

905,527.

Patented Dec. 1, 1908.

WITNESSES:

INVENTOR
George G. Hasbrouck
BY
Thomas F. Gaynor
ATTORNEY

UNITED STATES PATENT OFFICE.

GEORGE G. HASBROUCK, OF NYACK, NEW YORK.

PIANO.

No. 905,527.  Specification of Letters Patent.  Patented Dec. 1, 1908.

Application filed February 14, 1908. Serial No. 415,977.

*To all whom it may concern:*

Be it known that I, GEORGE G. HASBROUCK, a citizen of the United States, and a resident of Nyack, in the county of Rockland and State of New York, have invented certain new and useful Improvements in Pianos, of which the following is a specification.

This invention relates to piano construction, and it consists of a novel manner of holding together the frame plate, pin block, posts and back members of a piano by means of series of nut and double bolt fastening devices, and the object of the invention being to provide a more effective and readily adjustable means of binding these parts of a piano together, than is the common bolted method of uniting these parts as is practiced and in general use in present methods of pianoforte manufacture.

The invention can be more fully understood from the following specification taken in connection with the accompanying drawings which form a part thereof, and as will be more particularly pointed out in the claim.

Figure 1:
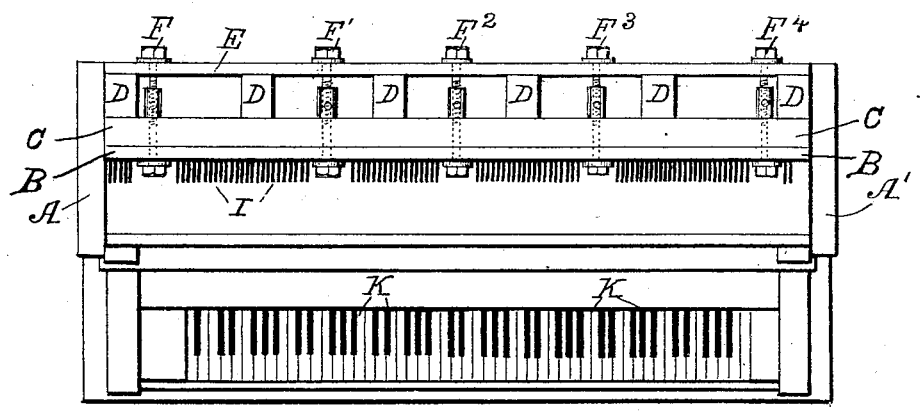
Figure 2:
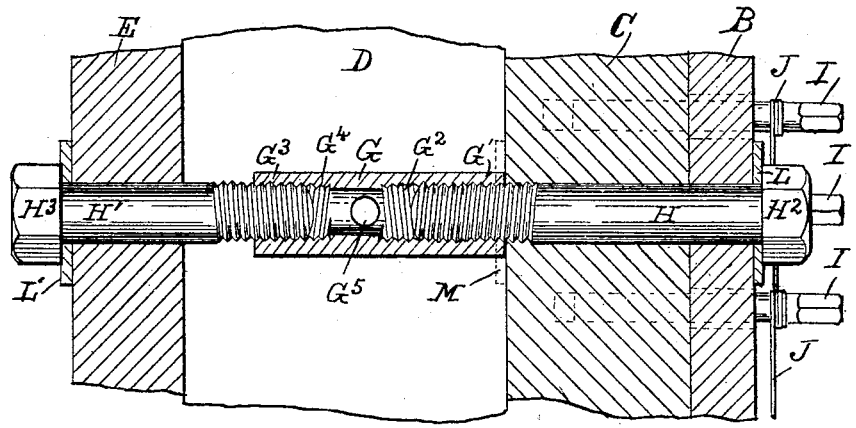

In the drawings, in which similar parts are designated by similar letters:—Figure 1, is a top view of a piano with the top cover removed, and showing a series of fasteners in position and holding the described parts of a piano case securely together. Fig. 2, is a vertical longitudinal section through the frame plate, pin block and back members of the piano, on the line of one of the fasteners, the nut and washers of which are also shown in section.

In the drawings:—A, A', represent the end members of a piano case of the upright class; B, the frame plate; C, the pin block; D, D, D, D, D, the posts; and E, the back member; respectively; all of which are shown as held rigidly together by the fasteners, F, F', F², F³, F⁴, as seen in Fig. 1. The lower parts of the frame plate, pin block, posts, and back member, respectively; can be also held together in a similar manner, by fasteners of similar construction, as can be understood. These fasteners are each composed of a middle sleeve nut G, of cylindrical shape threaded at one end G', with a left hand thread G², and the other end G³, with a right hand thread G⁴, and to which nut the bolts H, H', are correspondingly fitted. The nut G, has holes through the side one of which, G⁵, is seen in Fig. 2, for the purpose of receiving the end of a lever or wrench, that the nut may be turned around upon the bolts H, H', whenever the heads of the latter cannot be turned. This construction provides for binding the frame B, and block C, by means of the bolt H, and nut G, as seen in Fig. 2, while leaving the back E, and bolt H', detachable or detached from the frame plate B, and which in the case of a common bolt fastening could not be done, under like conditions.

L, L, represents washers under the heads H², H³, of the bolts H, H', to give proper bearing surface for the bolt heads against the frame and back parts of the instrument. The nut G, can have a flange or washer also provided between it and the adjacent surface of the block as indicated by the dotted lines M, in Fig. 2, if so desired. The piano can be otherwise made like any common instrument, and in which I, I, are the pins to which the strings J, J, are connected, and can be played upon by the keys K, K, through intermediate keyboard mechanism such as is found in any piano but which is omitted from the drawings as not being essential in the illustration or description of this invention, and which can be understood.

From the foregoing description, the purposes and advantages of the invention can be understood. By its use, a simple and effective means of assembling and holding the parts of the frame of a piano as described, securely together is provided, which can be adjusted either by the bolt heads or by the nut as may be found most convenient. It can thus be seen, that I provide a simple and complete device for the purpose intended, and that it meets all the requirements of such a construction of a pianoforte.

Having thus described my invention, what I claim, and desire to secure by Letters Patent, is:—

In a piano, the combination of a frame plate, a pin block, a back member, and a post between the back and pin block, and a fastening comprising the threaded nut G, and bolts H, H', substantially as described.

Signed at New York city, in the county of New York, and State of New York, this 11th day of February, A. D. 1908.

GEORGE G. HASBROUCK.

Witnesses:
C. G. MOSTACEULO,
GEO. MCCLELLAND.